(12) United States Patent
Smith et al.

(10) Patent No.: US 10,296,001 B2
(45) Date of Patent: May 21, 2019

(54) RADAR MULTIPATH PROCESSING

(71) Applicant: Uber Technologies, Inc., San Francisco, CA (US)

(72) Inventors: Warren Smith, Pittsburgh, PA (US); Howard Smith, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 123 days.

(21) Appl. No.: 15/335,692

(22) Filed: Oct. 27, 2016

(65) Prior Publication Data
US 2018/0120842 A1 May 3, 2018

(51) Int. Cl.
*G05D 1/00* (2006.01)
*G01S 13/93* (2006.01)
(Continued)

(52) U.S. Cl.
CPC ............ *G05D 1/0088* (2013.01); *G01S 7/412* (2013.01); *G01S 13/42* (2013.01); *G01S 13/865* (2013.01); *G01S 13/867* (2013.01); *G01S 13/931* (2013.01); *G01S 17/936* (2013.01); *G05D 1/0246* (2013.01); *G05D 1/0257* (2013.01)

(58) Field of Classification Search
CPC ...... G01S 19/48; G01S 13/89; G01S 13/0209; G01S 15/06; G01S 13/87; G01S 19/05; G05D 2201/0213; G05D 1/0257; G05D 1/0676; G05D 1/0261; G05D 2201/0204; G05D 2201/0212; G05D 1/021; G05D 1/0077; G05D 1/00; G05D 1/02; G05D 1/06; G05D 1/08; G05D 1/0088
See application file for complete search history.

(56) References Cited

U.S. PATENT DOCUMENTS 8,521,352 B1    8/2013  Ferguson
8,676,430 B1 *  3/2014  Ferguson ............. G05D 1/0274
                                               701/25
(Continued)

FOREIGN PATENT DOCUMENTS

EP    3032458    6/2016
RU    132393     9/2013
(Continued)

OTHER PUBLICATIONS

ISR and WO in PCT/US2017/046796 dated Feb. 28, 2018.
ISR in PCT/US2017/040532 dated Jan. 11, 2018.
ISR and Written Opinion in PCT/US2017/056277 dated Apr. 5, 2018.

*Primary Examiner* — Courtney D Heinle
*Assistant Examiner* — Luis A Martinez Borrero
(74) *Attorney, Agent, or Firm* — Dority & Manning, P.A.

(57) ABSTRACT

A control system of an autonomous vehicle (AV) can receive sensor data from a sensor array of the AV. The sensor data can comprise raw radar data from a radar system of the sensor array, and in many examples, a live LIDAR data from a LIDAR system of the sensor array. In certain implementations the control system can access a current localization map or a live LIDAR map of a surrounding area of the AV, and compare the raw radar data with the current localization map or the live LIDAR map to identify multipath objects in the raw radar data. The control system may then remove the multipath objects or track the actual objects corresponding to the multipath objects accordingly.

17 Claims, 8 Drawing Sheets

(51) Int. Cl.
*G01S 13/86* (2006.01)
*G01S 17/93* (2006.01)
*G05D 1/02* (2006.01)
*G01S 7/41* (2006.01)
*G01S 13/42* (2006.01)

(56) References Cited

U.S. PATENT DOCUMENTS

| | | |
|---|---|---|
| 8,825,265 B1 | 9/2014 | Ferguson et al. |
| 8,885,885 B2 * | 11/2014 | Datta ................. G06K 9/00778 |
| | | 382/103 |
| 9,140,792 B2 * | 9/2015 | Zeng ..................... G01C 21/32 |
| 9,459,625 B1 * | 10/2016 | Ferguson ............. G05D 1/0212 |
| 9,494,439 B1 | 11/2016 | Ross |
| 9,631,933 B1 | 4/2017 | Aula |
| 9,739,881 B1 * | 8/2017 | Pavek ..................... G01S 13/86 |
| 9,841,763 B1 * | 12/2017 | Valois .................. G05D 1/0088 |
| 9,902,403 B2 * | 2/2018 | Donnelly .......... B60W 50/0098 |
| 9,904,375 B1 * | 2/2018 | Donnelly ............. G06F 3/0346 |
| 2008/0033645 A1 * | 2/2008 | Levinson ............... G01C 15/00 |
| | | 701/469 |
| 2010/0262359 A1 | 10/2010 | Motoyama |
| 2012/0296539 A1 * | 11/2012 | Cooprider ............. B60W 10/06 |
| | | 701/70 |
| 2012/0310516 A1 | 12/2012 | Zheng |
| 2013/0060461 A1 * | 3/2013 | Wong ..................... B66F 9/063 |
| | | 701/408 |
| 2013/0117321 A1 | 5/2013 | Fischer |
| 2014/0046585 A1 * | 2/2014 | Morris, IV ............. G01C 21/00 |
| | | 701/468 |
| 2015/0023560 A1 * | 1/2015 | Datta ................. G06K 9/00778 |
| | | 382/103 |
| 2015/0369617 A1 * | 12/2015 | Ding ..................... G01C 21/34 |
| | | 701/428 |
| 2016/0054135 A1 | 2/2016 | Fowe |
| 2016/0125608 A1 * | 5/2016 | Sorstedt ................ G06T 7/0044 |
| 2016/0167582 A1 | 6/2016 | Chen |
| 2016/0349063 A1 * | 12/2016 | Maurer ............. G08G 1/096833 |
| 2017/0008521 A1 | 1/2017 | Braunstein |
| 2017/0023659 A1 * | 1/2017 | Bruemmer ............ G01S 5/0252 |
| 2017/0193826 A1 | 7/2017 | Marueli |
| 2017/0227647 A1 * | 8/2017 | Baik ...................... G01S 17/936 |
| 2017/0309172 A1 * | 10/2017 | Linder .................. G08G 1/0133 |
| 2017/0315229 A1 * | 11/2017 | Pavek ..................... G01S 13/86 |
| 2017/0316696 A1 | 11/2017 | Bartel |
| 2018/0060778 A1 | 3/2018 | Guo |
| 2018/0061242 A1 * | 3/2018 | Bavar ................ B60W 50/082 |
| 2018/0143639 A1 | 5/2018 | Singhal |

FOREIGN PATENT DOCUMENTS

| | | |
|---|---|---|
| WO | WO 2011055978 | 5/2011 |
| WO | WO 2014/147361 | 9/2014 |

* cited by examiner

RADAR MULTIPATH PROCESSING

BACKGROUND

Radar systems include transmitters that generate and emit radio signals, and a receiving antenna to capture any signals returns from objects of which the radio signals are reflected. Radar multipath occurs when multiple returns are detected from a single object. For example, aside from the direct wanted signal, reflections from buildings, the ground, or other surfaces adjacent to the main radar path can be detected by the radar receiver, resulting in multipath echoes from the target and causing ghost objects to appear.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
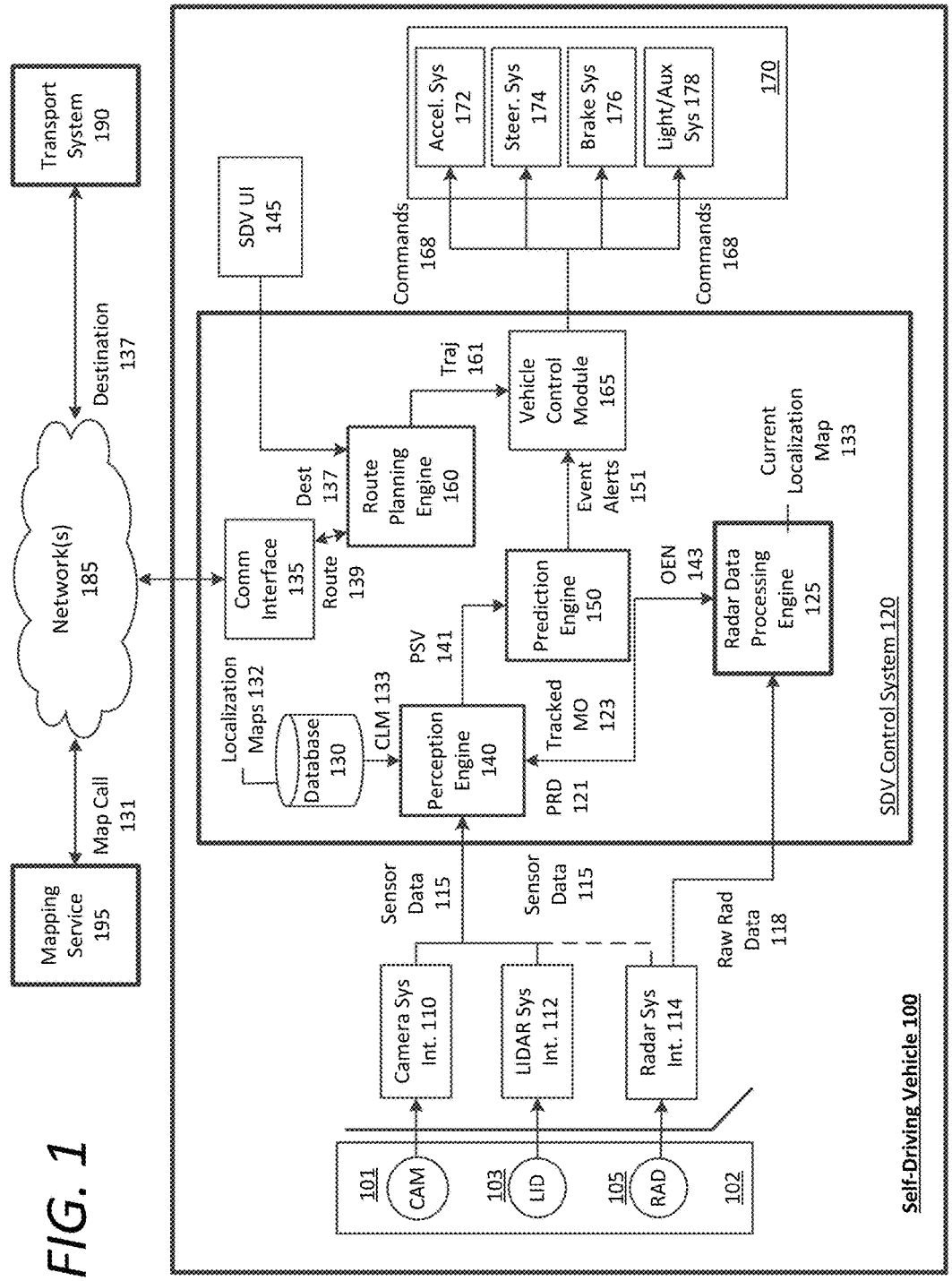
FIG. 1 is a block diagram illustrating an example self-driving vehicle implementing a control system, as described herein.

Radar systems may be incorporated with a sensor suite on autonomous vehicles (AVs) and self-driving vehicles (SDVs) to complement other sensor systems, such as LIDAR systems, image capturing systems (e.g., monocular or stereoscopic cameras), proximity sensors, sonar systems, and the like. While LIDAR and image capturing systems have significant advantages in positioning and angular surveying, they are comparatively insensitive in providing relative velocity data of objects of interest. Furthermore, LIDAR and image capturing systems are sensitive to inclement weather conditions (e.g., fog, mist, rain, or snow), whereas radar systems are largely invariant to such conditions. This makes radar useful in cross-validation of perception and prediction processes in the analysis engines of the SDV, and detection of distant objects of interest before detection by other sensor systems.

AVs can further utilize highly detailed localization maps to navigate through road and pedestrian traffic. These localization maps can comprise prerecorded and processed data (e.g., image data) that provides the AV's processing systems with a ground truth to compare with a live sensor view of the AV's immediate surroundings. In some aspects, the localization maps can be recorded by specialized vehicles recording street-view data, and can be parsed into sub-maps for each road segment in a given region. Thus, a control system of the AV can utilize a current localization map of a current road section and perform perception functions by dynamically comparing live LIDAR and image data with the current localization map to identify any potential hazards, such as other vehicles and pedestrians.

However, resolving radar multipath can consume valuable on-board computational resources of the AV's control system. For example, in narrow urban settings, several ghost objects can result from a single detected object (e.g., another vehicle or a bicyclist) due to reflectance from nearby buildings or other surfaces. To reduce the burden on the computational resources in resolving radar multipath, a radar multipath processing system described herein can receive raw radar data from a radar system of the AV and can output processed radar data to the AV's control system (e.g., with multipath signals removed). In some aspects, the multipath data processing system can access a current localization map indicating a current surrounding of the AV and correlate the raw radar data with the current localization map to identify any multipath objects in the raw radar data.

In certain implementations, the multipath processing system can process the raw radar data by removing the identified multipath objects from the raw radar data using the current localization map, and providing the processed radar data to the AV control system that utilizes the processed radar data to operate the acceleration, braking, and steering systems of the AV along a given route. In variations, the multipath processing system can identify objects of interest from the identified multipath objects, and enable the AV control system to track the objects of interest. For example, the multipath processing system can identify the objects of interest based on a velocity variance between the objects of interest and a remainder of the identified multipath objects. As another example, the multipath processing system can identify the objects of interest by comparing identified multipath objects with LIDAR data or image data.

Tracking multipath objects of interest (i.e., ghost objects) may be particularly suitable in resolving an occlusion detected in the sensor data. For example, large trucks, signage, foliage, buildings, and other occluding objects can obstruct the sensor view of the AV and significantly increase the probability of collision. In such scenarios, the multipath processing system may partially resolve the occlusion by detecting and identifying reflected returns from adjacent buildings or other surfaces. The AV control system can analyze angular and/or velocity data from multipath returns to position and track actual objects from their ghost counterparts (e.g., by way of ray tracing operations). In doing so, the AV control system can calculate the trajectories of such objects and determine whether it is safe to proceed.

Among other benefits, the examples described herein achieve a technical effect of eliminating radar multipath through utilization of localization maps stored on-board the autonomous vehicle (AV), or when desired, tracking multipath objects to determine trajectories and velocities of their actual counterparts (e.g., to resolve a sensor view occlusion).

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the terms "autonomous vehicle" (AV) or "self-driving vehicle" (SDV) may be used interchangeably to describe any vehicle operating in a state of autonomous control with respect to acceleration, steering, and braking. Different levels of autonomy may exist with respect to AVs and SDVs. For example, some vehicles may enable autonomous control in limited scenarios, such as on highways. More advanced AVs and SDVs can operate in a variety of traffic environments without any human assistance. Accordingly, an "AV control system" can process sensor data from the AV or SDV's sensor array, and modulate acceleration, steering, and braking inputs to safely drive the AV or SDV along a given route.

System Description

FIG. 1 is a block diagram illustrating an example self-driving vehicle implementing a control system, as described herein. In an example of FIG. 1, a control system 120 can autonomously operate the SDV 100 in a given geographic region for a variety of purposes, including transport services (e.g., transport of humans, delivery services, etc.). In examples described, the SDV 100 can operate without human control. For example, the SDV 100 can autonomously steer, accelerate, shift, brake, and operate lighting components. Some variations also recognize that the SDV 100 can switch between an autonomous mode, in which the SDV control system 120 autonomously operates the SDV 100, and a manual mode in which a driver takes over manual control of the acceleration system 172, steering system 174, braking system 176, and lighting and auxiliary systems 178 (e.g., directional signals and headlights).

According to some examples, the control system 120 can utilize specific sensor resources in order to intelligently operate the SDV 100 in a variety of driving environments and conditions. For example, the control system 120 can operate the SDV 100 by autonomously operating the steering, acceleration, and braking systems 172, 174, 176 of the SDV 100 to a specified destination. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes computational resources (e.g., processing cores and/or field programmable gate arrays (FPGAs)) which operate to process sensor data 115 received from a sensor system 102 of the SDV 100 that provides a sensor view of a road segment upon which the SDV 100 operates. The sensor data 115 can be used to determine actions which are to be performed by the SDV 100 in order for the SDV 100 to continue on a route to a destination. In some variations, the control system 120 can include other functionality, such as wireless communication capabilities using a communication interface 135, to send and/or receive wireless communications over one or more networks 185 with one or more remote sources. In controlling the SDV 100, the control system 120 can generate commands 168 to control the various control mechanisms 170 of the SDV 100, including the vehicle's acceleration system 172, steering system 157, braking system 176, and auxiliary systems 178 (e.g., lights and directional signals).

The SDV 100 can be equipped with multiple types of sensors 102 which can combine to provide a computerized perception of the space and the physical environment surrounding the SDV 100. Likewise, the control system 120 can operate within the SDV 100 to receive sensor data 115 from the collection of sensors 102 and to control the various control mechanisms 170 in order to autonomously operate the SDV 100. For example, the control system 120 can analyze the sensor data 115 to generate low level commands 168 executable by the acceleration system 172, steering system 157, and braking system 176 of the SDV 100. Execution of the commands 168 by the control mechanisms 170 can result in throttle inputs, braking inputs, and steering inputs that collectively cause the SDV 100 to operate along sequential road segments to a particular destination.

In more detail, the sensors 102 operate to collectively obtain a sensor view for the SDV 100 (e.g., in a forward operational direction, or providing a 360 degree sensor view), and further to obtain situational information proximate to the SDV 100, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, touch sensors, and the like. According to examples provided herein, the sensors 102 can be arranged or grouped in a sensor system or array (e.g., in a sensor pod mounted to the roof of the SDV 100) comprising any number of LIDAR, radar, monocular camera, stereoscopic camera, sonar, infrared, or other active or passive sensor systems.

Each of the sensors 102 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment of the SDV 100. The camera system 101 can provide the image data for the control system 120 via a camera system interface 110. Likewise, the LIDAR system 103 can provide LIDAR data to the control system 120 via a LIDAR system interface 112. Furthermore, as provided herein, raw radar data 118 from the radar system 105 of the SDV 100 can be provided to the control system 120 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In general, the sensor systems 102 collectively provide sensor data 115 to a perception engine 140 of the control system 120. The perception engine 140 can access a database 130 comprising stored localization maps 132 of the given region in which the SDV 100 operates. The localization maps 132 can comprise highly detailed ground truth data of each road segment of the given region. For example, the localization maps 132 can comprise prerecorded data (e.g., sensor data including image data, LIDAR data, and the like) by specialized mapping vehicles or other SDVs with recording sensors and equipment, and can be processed to pinpoint various objects of interest (e.g., traffic signals, road signs, and other static objects). As the SDV 100 travels along a given route, the perception engine 140 can access a current localization map 133 of a current road segment to compare the details of the current localization map 133 with the sensor data 115 in order to detect and identify any objects of interest, such as moving vehicles, pedestrians, bicyclists, and the like.

In various examples, the perception engine 140 can dynamically compare the live sensor data 115 from the SDV's sensor systems 102 to the current localization map 133 as the SDV 100 travels through a corresponding road segment. The perception engine 140 can flag or otherwise identify any objects of interest in the live sensor data 115 that can indicate a potential hazard. In accordance with many examples, the perception engine 140 can output a processed sensor view 141 indicating such objects of interest to a prediction engine 150, which can predict a path of each object of interest and determine whether the SDV control system 120 should respond or react accordingly. For example, the prediction engine 150 can dynamically calculate a collision probability for each object of interest, and generate event alerts 151 if the collision probability exceeds a certain threshold. As described herein, such event alerts 151 can be processed by a vehicle control module 165 that generates control commands 168 executable by the various control mechanisms 170 of the SDV 100, such as the SDV's acceleration, steering, and braking systems 172, 174, 176.

On a higher level, the SDV control system 120 can include a route planning engine 160 that provides the vehicle control module 165 with a travel trajectory 161 along a determined route 139 to a destination 137. In some aspects, the SDV 100 can include a user interface 145, such as a touch-screen panel or speech recognition features, which can enable a passenger to input a destination 137. Additionally or alternatively, the SDV control system 120 can include a communication interface 135 providing the SDV 100 with connectivity to one or more networks 185. In such implementations, the SDV 100 may communicate with a backend transport system 190 that manages routing of any number of SDVs operating throughout a given region to provide transportation services to requesting riders. Thus, the route planning engine 160 may receive the destination 137 from the backend transport system 190 over the network(s) 185 in order to plan a current route 139 for the SDV 100.

In mapping the current route 139, the routing engine 160 can utilize an on-board mapping engine, or can utilize an external mapping service 195 by transmitting map calls 131 over the network(s) 185 in order to receive a most optimal route 139 from a current location of the SDV 100 to the destination 137. This route 139 may be determined based on distance, time, traffic conditions, additional pick-ups (e.g., for carpooling services), and the like. For each successive road segment on which the SDV 100 travels, the route planning engine 160 can provide trajectory data 161 to the vehicle control module 165, to enable the vehicle control module 165 to operate the SDV 100 safely to the next road segment or the destination 137. For example, the trajectory data 161 can indicate that the vehicle control module 165 must change lanes or make a turn in order to proceed to the next road segment along the route 139.

According to examples provided herein, the vehicle control module 165 can utilize the trajectory data 161 and event alerts 151 to autonomously operate the control mechanisms 170 of the SDV 100. As a basic example, to make a simple turn based on the trajectory data 161, the vehicle control module 165 can generate control commands 168 that cause the lights and auxiliary systems 178 of the SDV 100 to activate the appropriate directional signal, the braking system 176 to slow the SDV 100 down for the turn, the steering system 174 to steer the SDV 100 into the turn, and the acceleration system 172 to propel the SDV 100 when exiting the turn. In further examples, event alerts 151 may indicate potential hazards such as a pedestrian crossing the road, a nearby bicyclist, obstacles on the road, a construction area, proximate vehicles, an upcoming traffic signal and signal state, and the like. The vehicle control module 165 can respond to each event alert 151 on a lower level while, on a higher level, operating the SDV 100 along the determined route 139.

Examples described herein recognize that radar multipath effects from the SDV's radar system 105 can consume significant processing resources of the SDV control system 120. For example, as the perception engine 140 processes the live sensor data 115 from the various sensor systems 102 of the SDV 100, the perception engine 140 may need to process and resolve several multipath objects in the raw radar data 118. Such multipath objects can correspond to reflected radar signals from objects of interest, such as pedestrians, bicyclists, other vehicles, and the like. In order to resolve such multipath objects, the perception engine 140 may first attempt to cross-correlate each multipath object with, for example, LIDAR data or image data. In some examples, this additional correlation step can affect the overall processing efficiency of the SDV control system 120, which can cause delays in resolving objects, generating event alerts, and even cause the SDV 100 to physically slow down.

To address these shortcomings, the SDV control system 120 can include a dedicated radar data processing engine 125 that can receive the raw radar data 118 from the SDV's radar system(s) 105. The radar data processing engine 125 can also access the database 130 to retrieve a current localization map 133 in order to readily distinguish between multipath objects and real objects. Specifically, the localization map 133 can provide a detailed ground truth map that includes any surfaces that can contribute to radar multipath, such as buildings and walls. Accordingly, when a return radar signal is detected by the radar system 105 from a certain direction and location, the radar data processing engine 125 can readily identify whether the source of the return signal is a multipath object (i.e., reflected from a surface identified in the current localization map 133) or the real object.

According to examples provided herein, the radar data processing engine 125 can treat the multipath objects in the raw radar data 118 in a number of ways. In one aspect, the radar data processing engine 125 can eliminate or otherwise remove all multipath objects from the raw radar data 118, and return processed radar data 121 to the perception engine 140. This processed radar data 121 can identify only actual objects of interest, which enables the perception engine 140 to more easily cross-correlate such objects with, for example, LIDAR data and image data. Accordingly, by removing multipath objects in the raw radar data 118 using the current localization maps 133, the radar data processing engine 125 provide a more seamless perception process by the SDV control system 120.

In further implementations, the radar data processing engine 125 can be utilized to identify and/or track certain multipath objects. For example, the perception engine 140 may identify an occlusion in the live sensor data 115, such as a large parked vehicle obstructing a view of orthogonal traffic at an intersection. These events can significantly increase the collision risk of the SDV 100 in proceeding through the intersection. In other examples, the occlusion may comprise a building or wall in a downtown urban environment. In still further examples, the occlusion can comprise foliage, a construction zone, or any other object that obstructs the live sensor view from the SDV's sensor systems 102.

As provided herein, the perception engine 140 can identify such occlusion events, and provide the radar data processing engine 125 with an occlusion event notification 143, which can indicate an obstructed field of view of the sensor data 115. In some aspects, the occlusion event notification 143 can provide the radar data processing engine 125 with angular ranges (e.g., three-dimensional coordinate ranges) indicating the scope of the occlusion. In some aspects, the radar data processing engine 125 can determine a direction and scope of the occlusion in relation to a current orientation of the SDV 120. In variations, the radar data processing engine 125 can identify such occlusions in the raw radar data 118 and/or the current localization map 133.

According to examples, the radar data processing engine 125 can at least partially resolve occlusion events by identifying and tracking multipath objects indicated in the raw radar data 118. For example, when an occlusion is detected, the radar data processing engine 125 can scan for multipath returns to identify multipath object behind the occlusion, and perform ray tracing operations to determine such parameters as location, velocity, and trajectory of the actual objects corresponding to the multipath returns. The radar processing engine 125 can then provide the perception engine 140 with data indicating the tracked multipath objects, or ghost objects of the actual objects of interest occluded by the obstruction. Accordingly, the perception engine 140 can be provided with multipath radar data that can at least partially resolve the occluded field of view, allowing for significantly safer progression of the SDV 100 along the current route 139 during such events. Furthermore, the processed sensor view 141 outputted by the perception engine 140 can provide a window through the occlusion comprised of multipath radar data generated by the radar data processing engine 125.

The prediction engine 150 may then utilize the processed sensor view 141—including the tracked multipath object data 123 indicating occluded objects of interest—to determine whether it is safe to proceed. As an example, the multipath return signals can indicate an occluded vehicle or bicyclist on an intersecting trajectory with the SDV 100. The prediction engine 150 can generate an event alert 151 indicating the collision potential, which can cause the vehicle control module 165 to proceed only after the event has passed. Further description of the radar processing engine 125 in connection with the SDV control system 120 is provided in the below discussion of FIG. 2.

Figure 2:
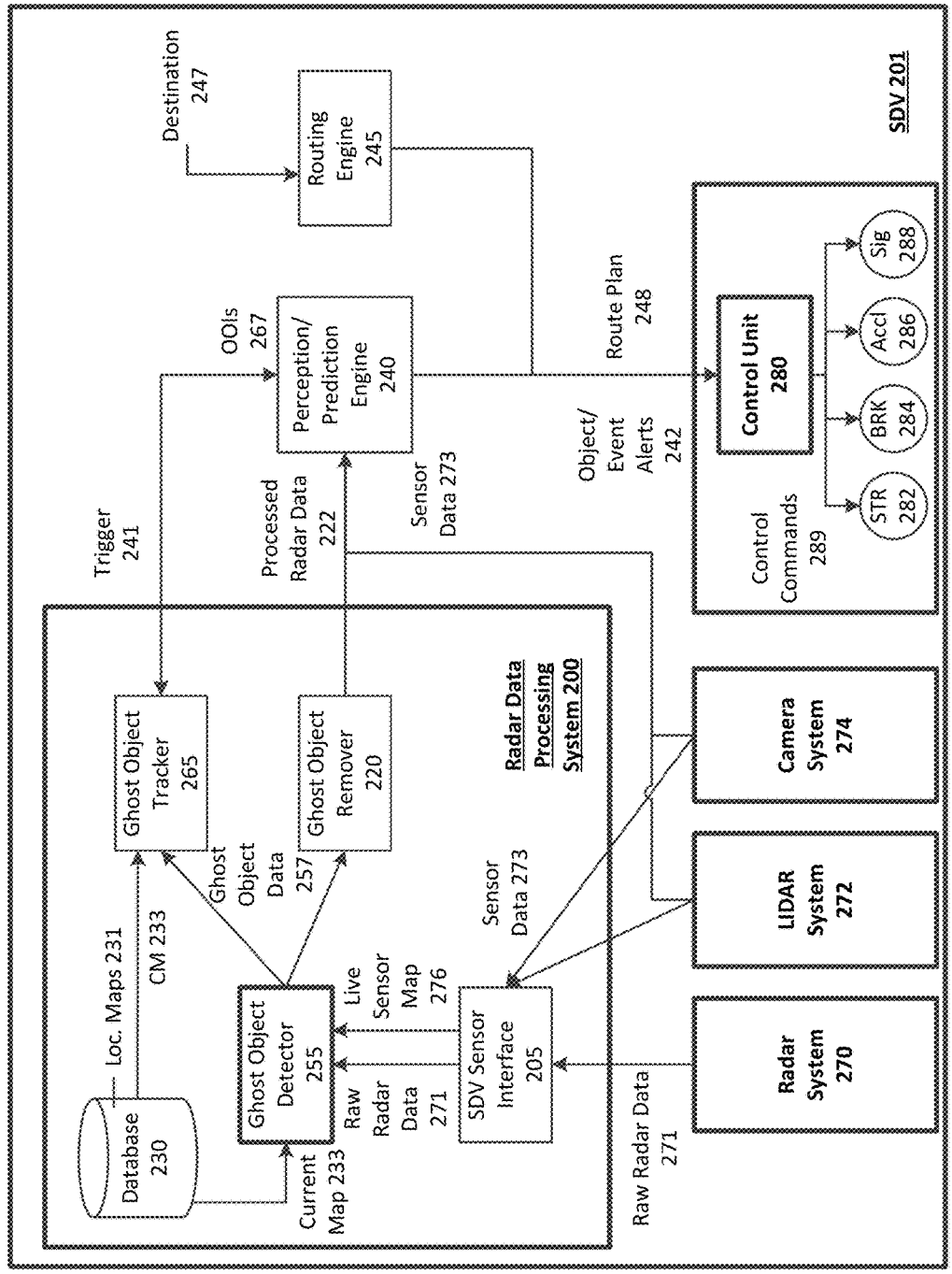
FIG. 2 is a block diagram illustrating an example radar data processing system utilized in connection with a self-driving vehicle, according to examples described herein.

FIG. 2 is a block diagram illustrating an example radar data processing system utilized in connection with a self-driving vehicle, according to examples described herein. Various examples of the radar data processing system 200 of FIG. 2 can comprise one or more components and include functionality described in connection with the SDV control system 120 of FIG. 1. Furthermore, as provided herein, the terms "multipath object" and "ghost object" may be used interchangeably, and generally refer to radar signal returns reflected from at least one surface in addition to the actual object itself. Referring to FIG. 2, the SDV 201 can include a vehicle control unit 280 generating control commands 189 executable by the various control mechanisms of the SDV 201, such as the steering 282, braking 284, acceleration 286, and signaling/lighting systems 288—as provided with the vehicle control module 165 and control mechanisms 170 of FIG. 1. Furthermore, the SDV 201 can include a perception/prediction engine 240 and routing engine 245 that include the same or similar functionality as the perception engine 140, prediction engine 150, and route planning engine 160 as shown and described with respect to FIG. 1.

According to examples described herein, the SDV 201 can further include a radar data processing system 200 operable to receive raw radar data 271 from a radar system 270 of the SDV 201. The radar system 270 can be included with a sensor suite of the SDV 201, which can further include, among other sensor systems, a LIDAR system 272 and a camera system 274. As described herein, the LIDAR system 272 can comprise any number of individual LIDAR modules having any number of fields of view. For example, the LIDAR system 272 can include a main LIDAR module above the roof of the SDV 201 that performs a continuous 360 degree sweep of the SDV's surrounding environment, and a number of additional LIDAR modules that have fields of view covering the sides and rear of the SDV 201. The camera system 274 can include any number of monocular or stereoscopic cameras facing in multiple directions of the SDV 201. For example, the camera system 274 can include one or more long range monocular cameras and multiple stereo cameras with forward fields of view, and additional cameras covering the rear and sideward blind spots of the SDV 201.

The radar data processing system 200 can include a database 230 of localization maps 231 for a given region in which the SDV 201 operates. The radar data processing system 200 can further include an SDV sensor interface 205 to receive raw radar data 271 from the radar system 270. In various implementations, the radar data processing system 200 can further include a ghost object detector 255 that can access the database 230 to pull a current localization map 233 in order to analyze the raw radar data 271 for ghost objects 257. In doing so, the ghost object detector 255 can identify radar signal returns in the raw radar data 271, and utilize the current localization map 233 to determine whether each return is due to multipath propagation or is from an object of interest. According to examples, the ghost object detector 255 can perform this detection operation dynamically by continuously referencing the current localization map 233 to flag multipath or ghost objects. As the SDV 201 proceeds to a next road segment along a current route, the ghost object detector 255 can pull a new current localization map 233 to analyze the raw radar data 271.

In certain implementations, the SDV sensor interface 205 can receive sensor data 273 from at least one of the LIDAR system 272 or the camera system 247. As provided herein, the sensor data 273 can comprise a live sensor map 276 of the surroundings of the SDV 201. Accordingly, just as with the current localization map 233, the ghost object detector 255 can utilize the live sensor map 276 to detect ghost objects in the raw radar data 271. Thus, in one example, the ghost object detector 255 need not have access to the detailed localization maps 231 in the database 230, and can instead rely solely on the live sensor map 276 from the LIDAR system 272 and/or camera systems 274 of the SDV 201. In doing so, the ghost object detector 255 can analyze radar signal returns in the raw radar data 271 by comparing the returns to the live sensor map 276, and determining whether they have been reflected from a surface (e.g., a building) or have come directly from an object of interest. As provided herein, the live sensor map 276 can comprise solely LIDAR data, solely image data, or a combination of LIDAR and image data. In further examples, the live sensor map 276 can comprise additional sensor data provided from, for example, infrared sensors, sonar systems, other proximity-type sensor, and the like. In variations, the ghost object detector 255 can utilize a combination of both the current localization map 233 and the live sensor map 276 to identify the ghost objects.

It is contemplated that certain SDV's may operate without the use of highly detailed localization maps 231. Such SDVs may instead utilize deep learning or deep neural networks trained to autonomously operate the SDV 201 along a given route, analyzing the live sensor map 276 from the various sensor systems of the SDV 201. For such implementations, the radar data processing system 200 may wholly rely on the live sensor map 276 (e.g., comprising LIDAR data, image data, proximity data, sonar data, etc.) to detect the ghost objects in the raw radar data 271.

Furthermore, in various implementations, the current localization map 233 or the live sensor map 276 can provide the ghost object detector 255 with designated open view fields, which can indicate whether a radar return signal is due to multipath or not. For example, both the current localization map 233 and the live sensor map 276 can show the various sensor view boundaries corresponding to surfaces and occlusion objects, such as buildings, walls, tunnels, guardrails, trees, overpasses, signage, bridges, landscape features (e.g., mountains, hills, rocks, bushes, brush, etc.), and the like. The ghost object detector 255 can utilize such boundaries to readily identify directional signal returns that are either (i) from an open view field as permitted by the current localization map 233 or live sensor map 276, or (ii) from a red flag zone corresponding to the sensor view boundaries, and indicating that the detected object is a multipath object.

In any case, once the ghost objects are detected, the radar data processing system 200 can either remove one or more of the ghost objects from the raw radar data 271, or identify and track one or more of the detected ghost objects. In many examples, the full removal of the ghost objects may be preferred in order to streamline the perception and prediction processes by the perception/prediction engine 240. In such implementations, the radar data processing system 200 can include a ghost object remover 220, which can receive the ghost object data 257 from the ghost object detector 255, and remove each of the ghost objects from the raw radar data 271 to provide the perception/prediction engine 240 with processed radar data 222. As provided herein, the processed radar data 222 can comprise radar data indicating only actual objects of interest with multipath objects removed.

Accordingly, the perception/prediction engine 240 can utilize the processed radar data 222 along with the live sensor data 273 from the other sensor systems of the SDV 201 (e.g., the LIDAR and the camera systems 272, 274) to provide object and event alerts 242 to the vehicle control unit 280 of the SDV 201. These object and event alerts 242 can comprise any potential hazards having a certain collision probability, which the vehicle control unit 280 can monitor and modulate acceleration, braking, and steering inputs accordingly. In doing so, the vehicle control unit 280 can dynamically generate control commands 289 on a highly granular level to react to each alert 242 according to a severity of the alert 242. In some aspects, the perception and prediction engine 240 can classify objects of interest in the overall sensor view (e.g., comprised of sensor data from all of the SDV's sensor systems) as either dynamic objects, such as people, animals, and other vehicles, or static objects, such as buildings, parked vehicles, and road features. Accordingly, the object and event alerts 242 can indicate a sliding scale of hazard severity, where the vehicle control unit 280 is to monitor certain dynamic objects with extreme caution (e.g., proximate pedestrians), which ignoring certain static object outright (e.g., a fire hydrant or parking meter). In further examples, the object and event alerts 242 can notify the vehicle control unit 280 of road signs and traffic signals, so that the vehicle control unit 280 can identify and/or monitor such objects and modulate control inputs accordingly.

In accordance with various examples described herein, the routing engine 245 can receive a destination 247 and generate a route plan 248 that the vehicle control unit 280 can follow on a higher level. The route plan 248 can provide the vehicle control unit 280 with information corresponding to upcoming turns, freeway exits or onramps, traffic conditions, and intersection information. Thus, autonomous operation of the SDV 201 can comprise high level autonomous operation of the steering 282, braking 284, acceleration 286, and signaling systems 288 of the SDV 201 according to the route plan 248, and low level decision-making and reaction to objects and events according to flagged objects of interest indicated in the object and event alerts 242 provided by the perception/prediction engine 240.

In some aspects, the radar data processing system 200 can include a ghost object tracker 265 that can process the ghost object data 257 from the ghost object detector 255 to identify and track multipath objects of interest 267. For example, the ghost object tracker 265 can analyze the ghost object data 257 for velocity variance—as compared to background objects—to identify multipath objects of interest 267 that have a certain probability of colliding with the SDV 201. In such examples, the ghost object tracker 265 can either disregard static ghost objects, or can monitor and track all detected ghost objects dynamically. In doing so, the ghost object tracker 265 can utilize the current localization map 233 to perform ray tracing operations in order to monitor the position and/or trajectory of the multipath objects of interest 267. In certain examples, this position and/or trajectory data can be provided to the perception/prediction engine 240 for cross-verification of the actual objects—corresponding to the multipath objects of interest 267—in the overall sensor view.

According to some aspects, the ghost object tracker 265 can be initiated by a trigger 241 from the perception/prediction engine 240. For example, when a significant occlusion exists in the overall sensor view, the perception and prediction engine 240 may benefit from radar multipath data to at least partially resolve the occlusion. Accordingly, the perception/prediction engine 240 can transmit a trigger 241 to the ghost object tracker 265 of the radar processing system 200 to begin analyzing the ghost object data 257 for multipath objects of interest 267. In some aspects, the ghost object tracker 265 can focus solely on objects of interest that are behind the occlusion. In doing so, the ghost object tracker 265 can utilize the current localization map 233 to perform ray tracing to identify dynamic objects that are within an occluded area behind an obstruction, or that have trajectories that intersect the occluded area.

In various aspects, the ghost object tracker 265 can provide data indicating these multipath objects of interest 267 to the perception/prediction engine 240, which can utilize the data to generate object and event alerts for the actual objects corresponding to the multipath objects of interest 267. Accordingly, the perception/prediction engine 240 can be provided with a window through the occlusion by way of analyzing the ghost object data 257 and performing ay tracing. As provided herein, the ghost object tracker 265 can utilize the current localization map 233 to do so, or can utilize the live sensor map 276 from other sensor systems of the SDV 201 (e.g., the LIDAR system 272 and/or the camera system 274).

Self-Driving Vehicle in Operation

Figure 3:
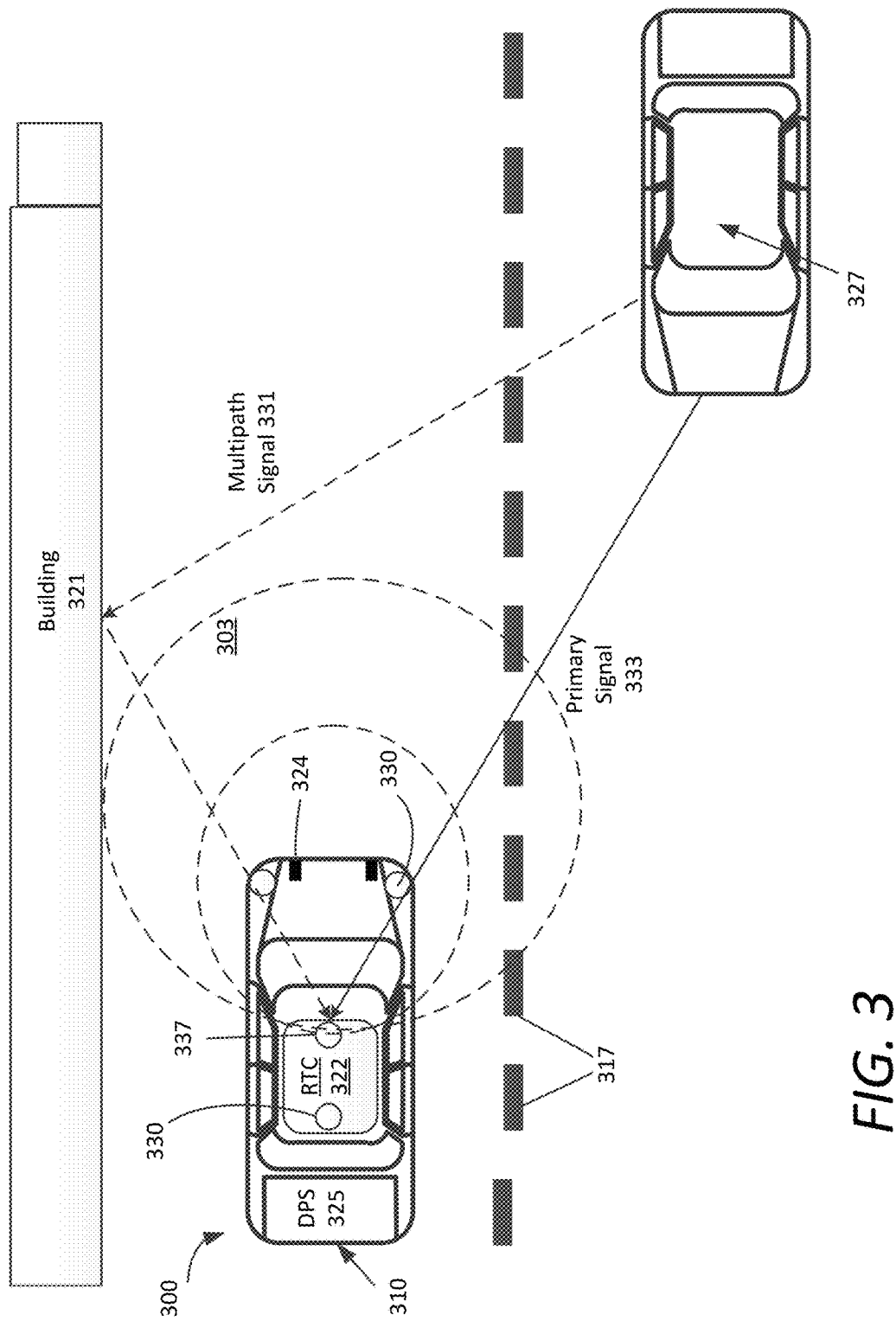
FIG. 3 shows an example of an autonomously controlled self-driving vehicle utilizing sensor data to navigate an environment in accordance with example implementations.

FIG. 3 shows an example of an autonomously controlled self-driving vehicle utilizing sensor data to navigate an environment in accordance with example implementations. In an example of FIG. 3, the autonomous vehicle 300 may include various sensors, such as a roof-top camera array (RTC) 322, forward-facing cameras 324, and a number of LIDAR systems 330. In some aspects, a data processing system 325, comprising a combination of one or more processors, FPGAs, and/or memory units, can be positioned in the cargo space 310 of the SDV 300.

According to an example, the SDV 300 can use one or more sensor views (e.g., a stereoscopic or 3D image of the SDV's environment) to scan a road segment on which the vehicle 300 traverses. The vehicle 300 can process image data or sensor data, corresponding to the sensor views from one or more sensors in order to detect objects that are, or may potentially be, in the path of the vehicle 300.

The vehicle 300 may determine the location, size, and/or distance of objects in the environment based on the sensor views. For example, the sensor views may be 3D sensor images that combine sensor data from the roof-top camera array 322, front-facing cameras 324, and/or LIDAR systems 330. Accordingly, the vehicle 300 may accurately detect the presence of objects in the environment 300, allowing the vehicle to safely navigate the route while avoiding collisions with other objects.

According to examples, the data processing system 325 may determine a collision probability for each of one or more objects in the environment, or whether any objects of interest will interfere with the vehicle 300 along the vehicle's current path or route. In some aspects, the vehicle 300 may selectively perform an avoidance action based on the probability of collision. The avoidance actions may include velocity adjustments, lane aversion, roadway aversion (e.g., change lanes or drive further from the curb), light or horn actions, and other actions. In some aspects, the avoidance action may run counter to certain driving conventions and/or rules (e.g., allowing the vehicle 300 to drive across center line to create space with bicyclist).

In certain variations, the data processing system 325 may implement a deep neural network through a series of training, test, and real-world implementation phases to ultimately build a robust skillset in autonomously operating the vehicle 300 on par with or exceeding human ratings or safety standards for autonomous driving. Thus, in analyzing the sensor view, the deep neural network can make on-the-fly assessments with regard to each detected object, and proactively control the autonomous vehicle 300 in accordance with certain safety standards (e.g., Safe Practices for Motor Vehicle Operations standards). In doing so, the deep neural network can seek to optimize autonomous driving habits in light of minimizing risk of collision (e.g., by identifying and anticipating potentially dangerous situations), implementing an assured clear distance ahead (e.g., a velocity-based following standard), and even practicing specific driving techniques geared towards efficiency and safety.

In an example shown in FIG. 3, the detected objects include another vehicle 327—each of which may potentially cross into a road segment 315 along which the vehicle 310 traverses. The vehicle 310 can use information about the road segment and/or image data from the sensor views to determine that the road segment includes a divider 317 and an opposite lane, as well as an adjacent building 321. According to examples provided herein, the sensor systems of the SDV 300 can further include a radar system 337. The radar system 337 can be utilized by the data processing system 325 to complement the sensor view provided by the roof-top camera array 332, forward-facing cameras 324, and LIDAR systems 330. Radar may have advantages over other sensor systems, such as velocity detection or velocity differential detection. Furthermore, radar data is largely invariant to factors such as precipitation, fog, and mist, which tend to significantly affect the primary sensor systems of the SDV (e.g., the camera and LIDAR systems).

As shown in FIG. 3, the radar system 337 can emit an electromagnetic signal 303 (e.g., in the radio or microwave frequency range) and receive return signals from any objects in the path of the emitted signal 303. A vehicle 327 traveling in a line of sight of the SDV 300 will return a primary signal 333, which is detected by a receiver of the radar system 337. However, radar signals have high reflectance, so the vehicle 327 can return one or more additional, multipath signals (e.g., multipath signal 331 reflected from the surface of the building 321). In typical environments, resolving the multipath signal 331 can undesirably consume a certain amount of processing resources of the data processing system 325 by attempting to verify the multipath object using sensor data from other sensor systems. According to examples described herein, the data processing system 325 can instead utilize a current localization map of the road segment to quickly identify the building 321, and hence recognize and remove the multipath signal 331.

Figure 4A:
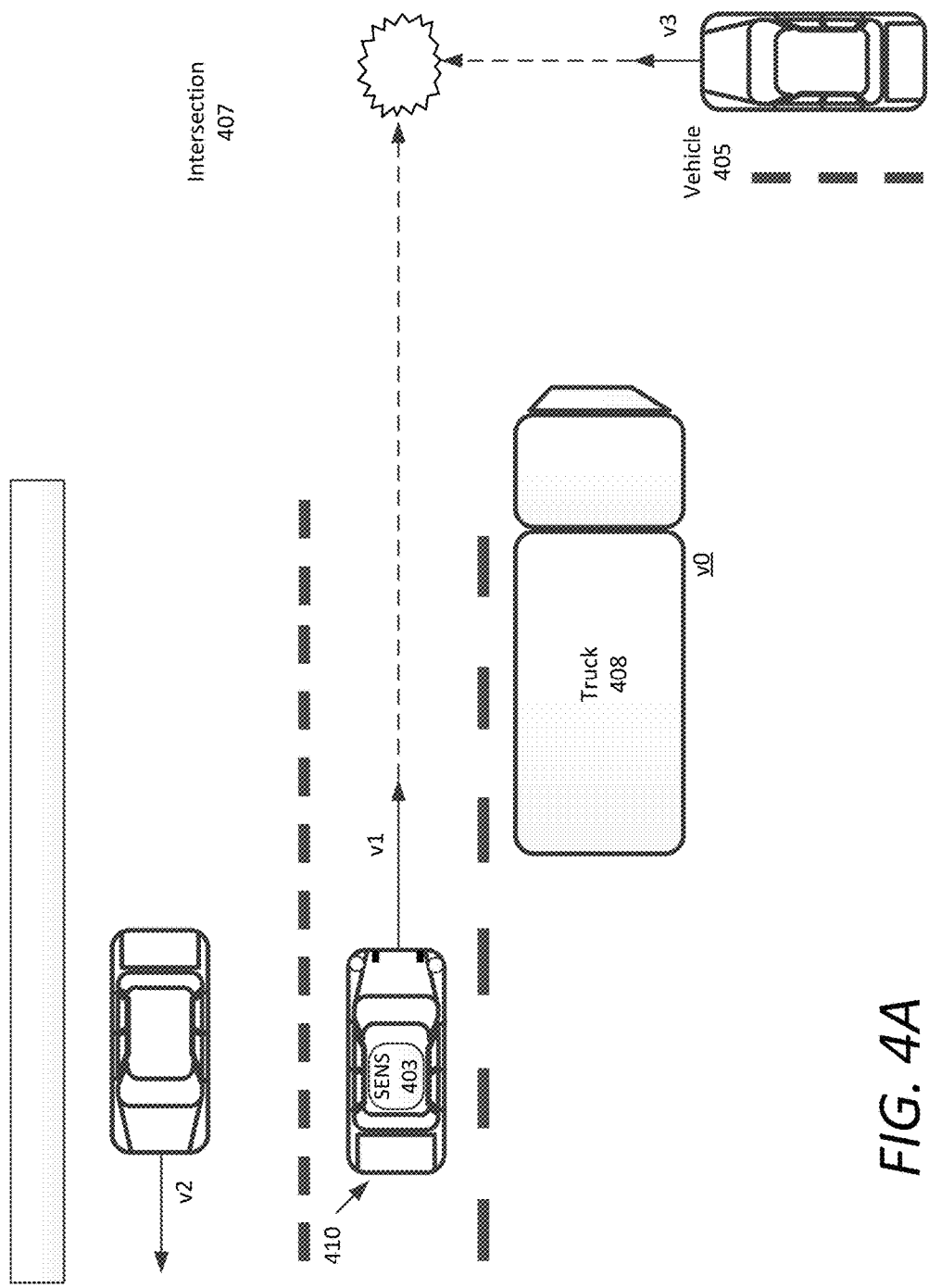
FIGS. 4A and 4B show an example self-driving vehicle utilizing radar multipath processing system, in accordance with example implementations.
Figure 4B:
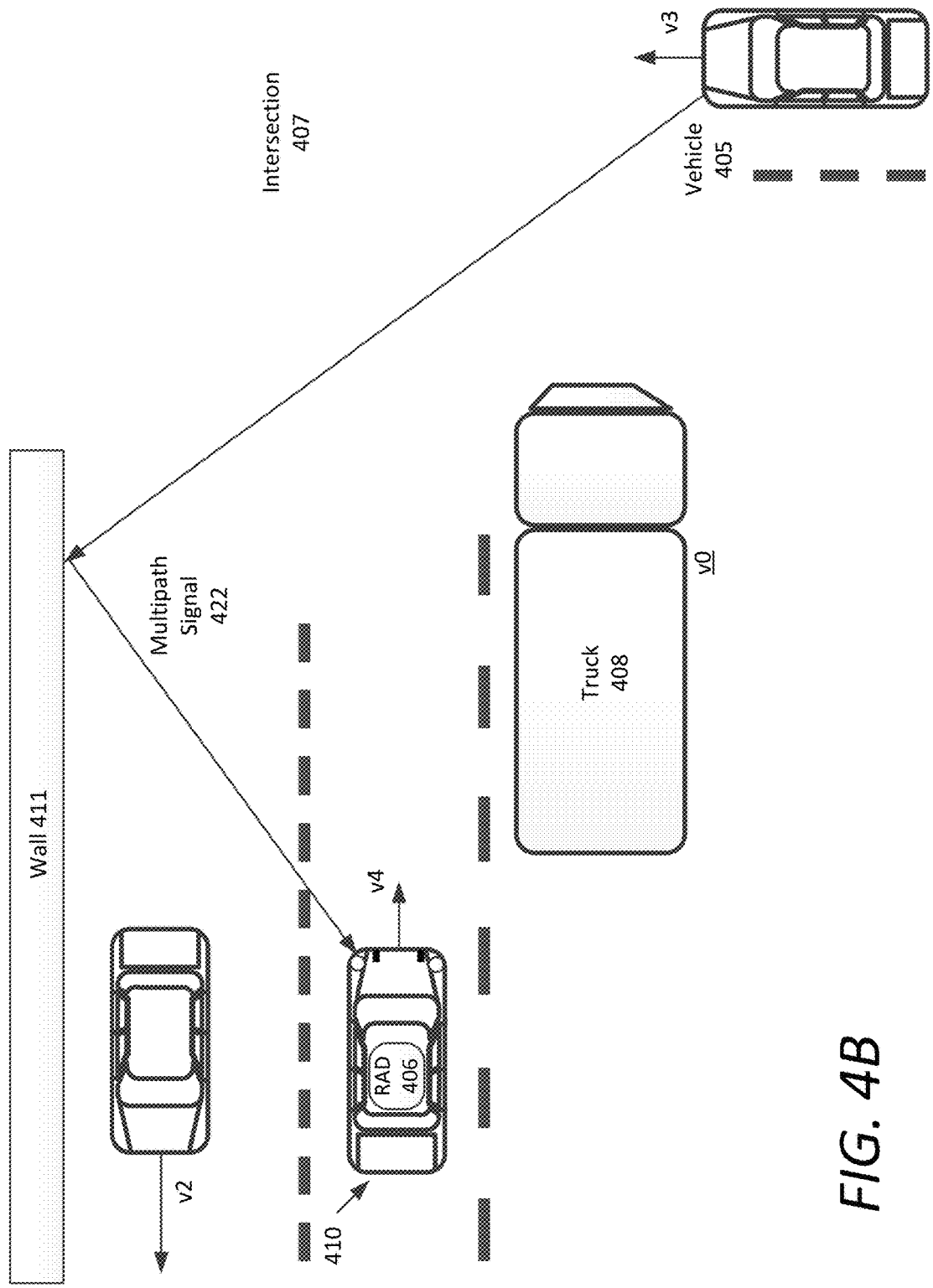

FIGS. 4A and 4B show an example self-driving vehicle utilizing radar multipath processing system, in accordance with example implementations. Referring to FIG. 4A, the SDV 410 approaches an intersection 407 at velocity v1. A parked truck 408 (with velocity v0) occludes the SDV's 410 sensor view of a vehicle 405 that is entering the intersection 407. Accordingly, the sensor systems 403 (e.g., LIDAR, camera, sonar, IR, etc.) of the SDV 410 are unable to detect the vehicle 405 and determine whether the vehicle 405 is on a collision trajectory with the SDV 410. In such example scenarios, the SDV 410 may benefit from analyzing radar multipath signals to attempt to at least partially resolved the occlusion.

Accordingly, referring to FIG. 4B, the SDV 410 can utilize its radar system 406 and a current localization map and/or a live sensor map to identify a wall 411 from which radar signals may be reflected. In some aspects, the SDV 410 can perform a ray tracing operation on a detected multipath signal 422 to identify not only the position of the vehicle 405, but also that the vehicle 405 is advancing into the intersection 407. Based on the multipath signal 422 reflected from the wall 411, the SDV 410 can resolve the occluded field of view caused by the truck 408, and thus respond accordingly (e.g., by reducing its speed to v4).

Methodology

Figure 5:
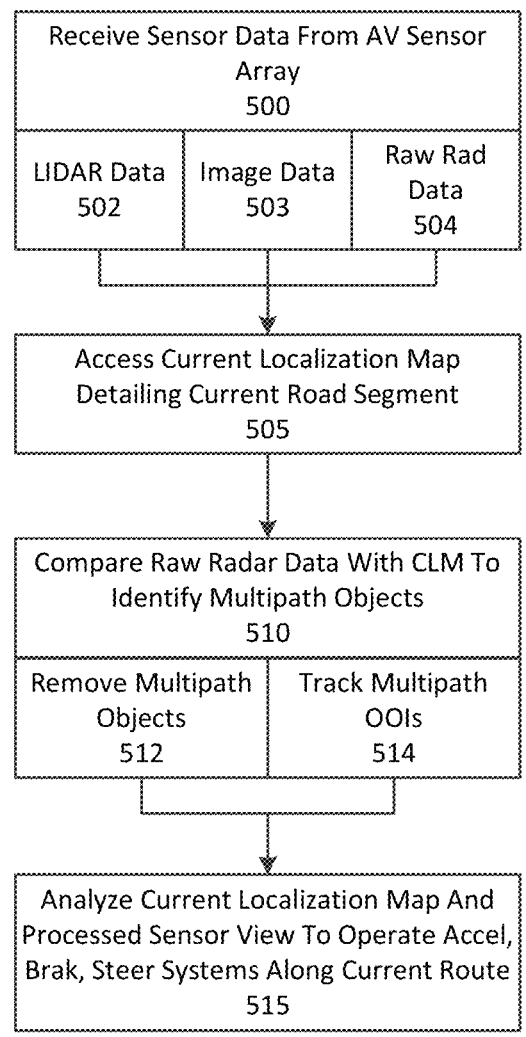
FIG. 5 is a flow chart describing an example method of autonomously operating a self-driving vehicle using a radar multipath processing system, according to examples described herein.
Figure 6:
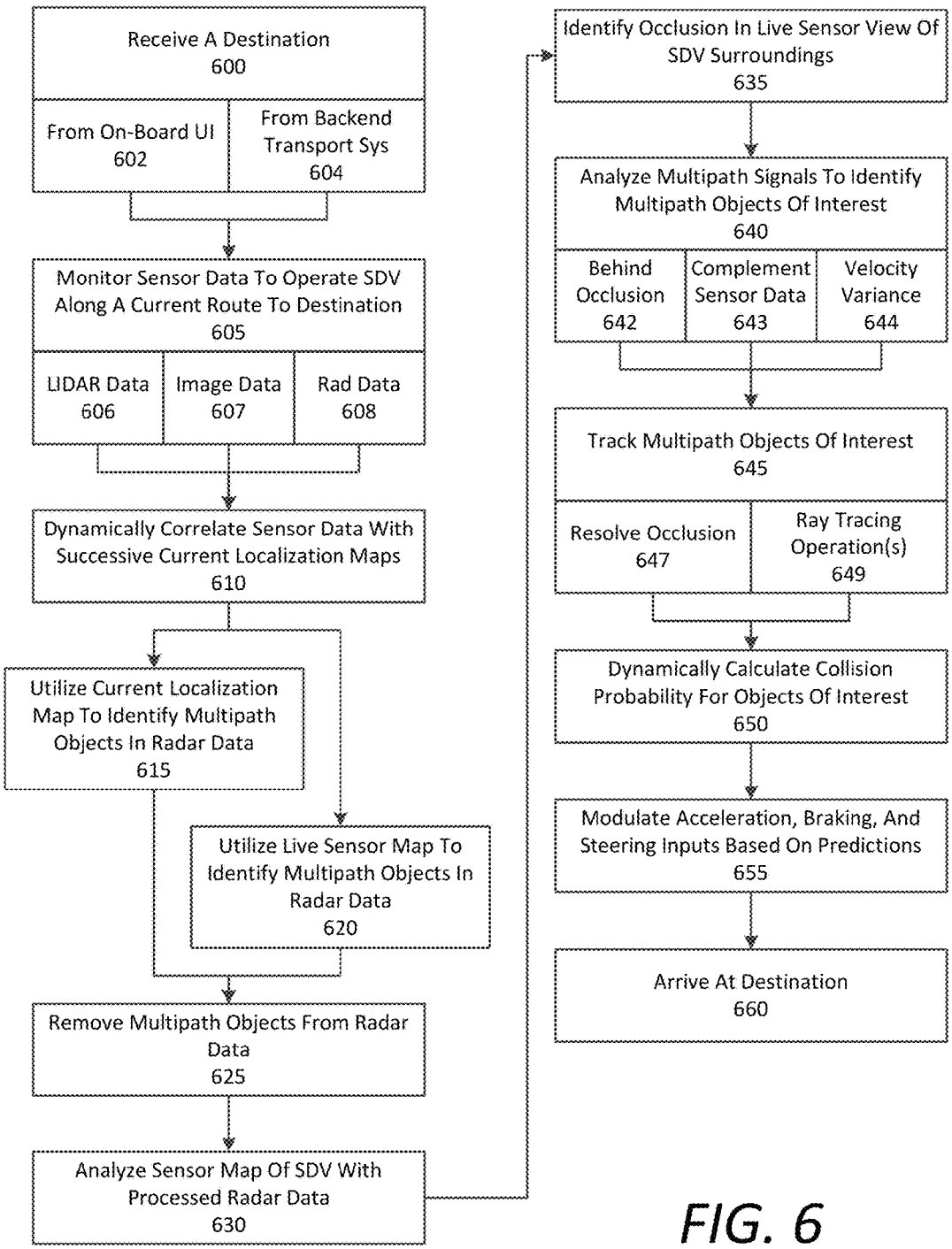
FIG. 6 is a lower level flow chart describing an example method of autonomously operating a self-driving vehicle using a radar multipath processing system, according to examples described herein.

FIGS. 5 and 6 are a flow chart describing example methods of autonomously operating a self-driving vehicle using a radar multipath processing system, according to examples described herein. In the below descriptions of FIGS. 5 and 6, reference may be made to reference characters representing like features as shown and described with respect to FIGS. 1 and 2. Furthermore, the individual processes discussed with respect to FIGS. 5 and 6 may be performed by an example SDV control system 120 implementing a radar data processing engine 125 as shown in FIG. 1, and/or an SDV 201 utilizing a radar data processing system 200 as shown in FIG. 2. Accordingly, in the below descriptions of FIGS. 5 and 6, reference may be made interchangeably to the SDV 100, 201 in general and/or the SDV control system 120 implementing a radar data processing system 125, 200 of FIGS. 1 and 2. Still further, it is contemplated that a particular step described either individually or as part of an additional step can be combined with or omitted from other individually described steps of FIGS. 5 and 6.

Referring to FIG. 5, an SDV control system 120 can receive sensor data 115 from an AV sensor array 102 (500). In many aspects, the sensor data 115 can include LIDAR data from a LIDAR system 103 (502), image data 503 from a camera system 101 (e.g., including any number of monocular or stereo cameras) (503), and raw radar data 118 from a radar system 105 of the SDV 100 (504). The SDV control system 120 may access a current localization map 133 that details a current road segment on which the SDV 100 is traveling (505). As described herein, the localization maps 132 stored in an on-board database 130, or accessed over a network 185, can comprise detailed recorded data providing the SDV control system 120 with a ground truth to which the live sensor data 115 may be compared.

In various implementations, the SDV control system 120 may then compare the raw radar data 118 with the current localization map 133 to identify any multipath objects in the raw radar data 118 (510). Thereafter, the SDV control system 120 may either remove the multipath objects from the radar data 118 (512) or identify and track multipath objects of interest in the raw radar data 118 (514). Accordingly, the SDV control system 120 analyzes a processed sensor view 141 (e.g., comprising a live LIDAR/image data map and processed radar data 121 with multipath signals removed) concurrently with the current localization map 133 to operate the acceleration 172, braking 176, and steering systems 174 of the SDV 100 along a current route 139 (515).

FIG. 6 is a lower level flow chart describing an example method of autonomously operating a self-driving vehicle using a radar multipath processing system 200. Referring to FIG. 6, the SDV control system 120 can receive a destination 137 (600). The destination 137 may be received by either directly from a passenger via an on-board user interface 145 (602) or from a backend transport system 190 over one or more networks 185 (604). In general, the SDV control system 120 can monitor sensor data 115 comprising a live sensor map 276 to operate the SDV 100 along a current route 139 to the destination 137 (605) In some implementations, the sensor data 115 comprising the live sensor map 276 can comprise LIDAR data (606), image data (607), and radar data (608). Furthermore, in some examples, the SDV control system 120 can operate the SDV 120 by implementing a deep learning neural network that autonomously operates the SDV's control mechanisms 170, and/or via execution of instruction sets to continuously compare or correlate the live sensor map 276 with successive localization maps 132 of road segments of the current route 139 (610).

In certain aspects, the SDV control system 120 can utilize the current localization map 133 to identify multipath objects (or ghost objects) in the radar data 118 (615). In variations or as an addition, the SDV control system 120 can utilize the live sensor map 276 to identify multipath objects in the radar data 118 (620). In either case, the SDV control system 120 may remove the multipath signals and/or objects from the radar data 1187 (625) and analyze the live sensor map 276 with the processed radar data 121—or radar data with multipath objects removed (630).

In various examples, the SDV control system 120 may identify an occlusion in the live sensor map 267 of the SDV's surroundings (635). In these examples and other implementations described herein, the SDV control system 120 can analyze the multipath signals in the raw radar data 118 to identify any multipath objects of interest 267 (640). For example, the SDV control system 120 can focus on only multipath objects that can be traced (e.g., via ray tracing) to actual objects of interest that a behind or otherwise obstructed by the occlusion (642). In variations, the SDV control system 120 can identify any multipath objects of interest 267 to complement the sensor data 115 that comprises the live sensor map 276, or otherwise cross-verify objects using the multipath signals (643). In some examples, the SDV control system 120 can focus solely or mainly on multipath objects that have velocity variance as compared to other multipath objects (644). In doing so, the SDV control system 120 can detect potentially detect objects behind the occlusion that have a non-zero collision probability.

According to examples, the SDV control system 120 may then track the multipath objects of interest 267 (645). For example, the SDV control system 120 can track the multipath objects of interest 267 by performing ray tracing operations to determine the actual trajectories of their actual counterpart objects (649). It is therefore contemplated herein that the foregoing analysis of such radar multipath objects 267 can at least partially resolve the occluded field of view (647). In this manner, the SDV control system 120 can detect moving vehicles, pedestrians, bicyclists, or any other potential hazard that is behind the occlusion using reflected radar signals. As provided herein, in tracking the multipath objects of interest 267, the SDV control system 120 can dynamically calculate collision probabilities of the actual objects corresponding to the multipath objects 267 (650), and modulate the SDV's acceleration 172, braking 176, and steering system 174 inputs based on such predictions (655). Based on the foregoing processes described with respect to FIGS. 5 and 6, the SDV control system 120 can safely autonomously drive the SDV 100 to arrive at the destination 137 (660).

Hardware Diagrams

Figure 7:
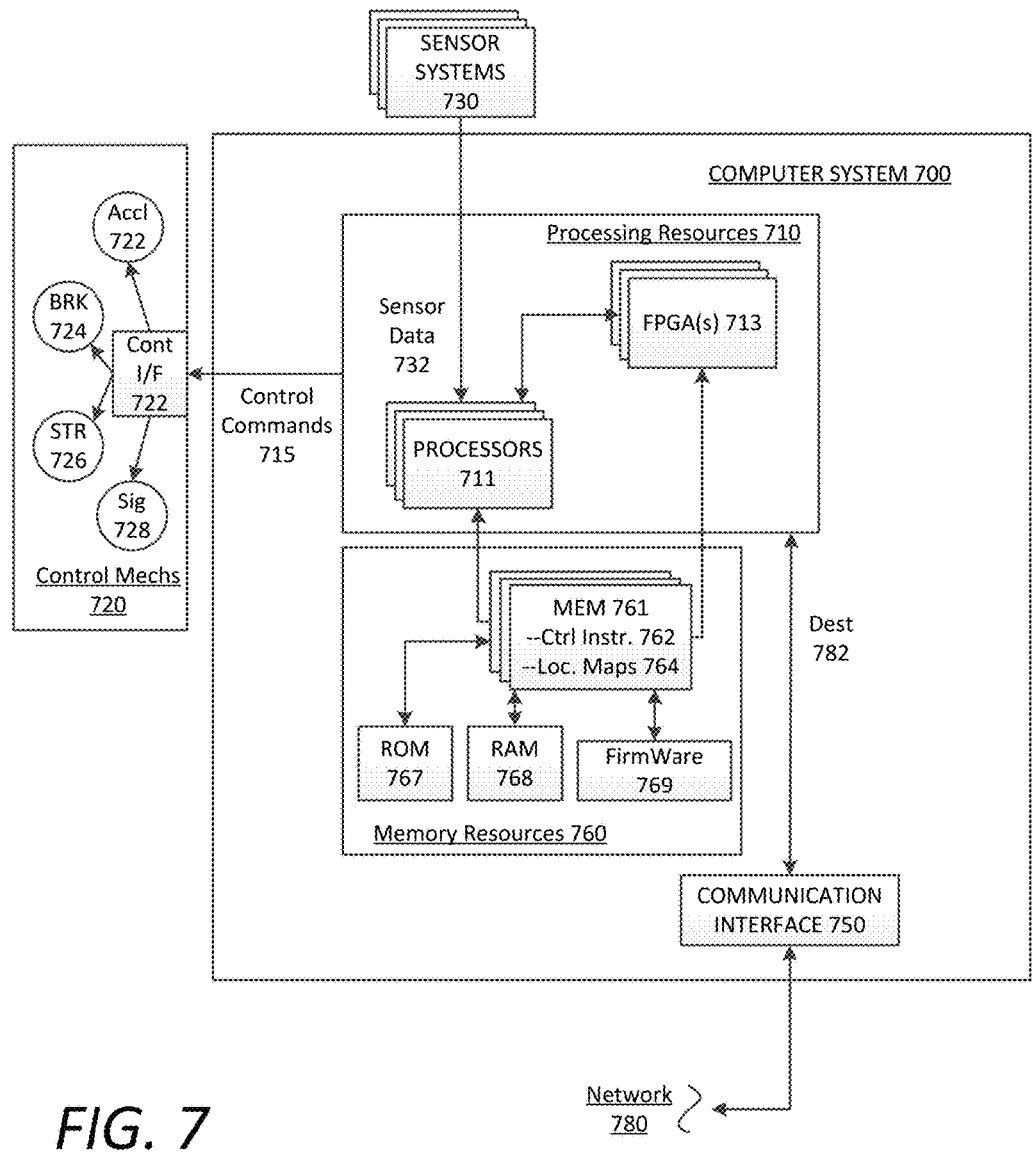
FIG. 7 is a block diagram illustrating a computer system for a self-driving vehicle upon which examples described herein may be implemented.

FIG. 7 is a block diagram illustrating a computer system upon which example SDV processing systems described herein may be implemented. The computer system 700 can be implemented using a number of processing resources 710, which can comprise processors 711, field programmable gate arrays (FPGAs) 713. In some aspects, any number of processors 711 and/or FPGAs 713 of the computer system 700 can be utilized as components of a neural network array implementing a machine learning model and utilizing road network maps stored in memory 761 of the computer system 700. In the context of FIGS. 1 and 2, various aspects and components of the control system 120, radar processing system 200, perception and prediction engines 140, 150, 240, and route planning engines 160, 245 can be implemented using one or more components of the computer system 700 shown in FIG. 7.

According to some examples, the computer system 700 may be implemented within an autonomous vehicle or self-driving vehicle (SDV) with software and hardware resources such as described with examples of FIGS. 1 and 2. In an example shown, the computer system 700 can be distributed spatially into various regions of the SDV, with various aspects integrated with other components of the SDV itself. For example, the processing resources 710 and/or memory resources 760 can be provided in a cargo space of the SDV. The various processing resources 710 of the computer system 700 can also execute control instructions 762 using microprocessors 711, FPGAs 713, or any combination of the same.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 722), sensor systems 730, and can further provide a network link to a backend transport management system (implemented on one or more datacenters) over one or more networks 780. For example, the processing resources 710 can receive a destination 782 over the one or more networks 780, or via a local user interface of the SDV.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid state drives.

The memory 761 may also store localization maps 764 in which the processing resources 710—executing the control instructions 762—continuously compare to sensor data 732 from the various sensor systems 730 of the SDV. Execution of the control instructions 762 can cause the processing resources 710 to generate control commands 715 in order to autonomously operate the SDV's acceleration 722, braking 724, steering 726, and signaling systems 728 (collectively, the control mechanisms 720). Thus, in executing the control instructions 762, the processing resources 710 can receive sensor data 732 from the sensor systems 730, dynamically compare the sensor data 732 to a current localization map 764, and generate control commands 715 for operative control over the acceleration, steering, and braking of the SDV. The processing resources 710 may then transmit the control commands 715 to one or more control interfaces 722 of the control mechanisms 720 to autonomously operate the SDV through road traffic on roads and highways, as described throughout the present disclosure.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. An autonomous vehicle (AV) comprising:
a sensor array comprising at least a radar system;
acceleration, braking, and steering systems;
a memory storing a set of localization maps for a given region; and an AV control system comprising one or more processors executing an instruction set causing the AV control system to:
receive sensor data from the sensor array, the sensor data including radar data from the radar system;
access a current localization map from the set of localization maps stored in the memory, the current localization map indicating a current surrounding of the AV;
compare the radar data with the current localization map to identify multipath objects in the radar data;
from the identified multipath objects, identify one or more multipath objects of interest;
track the one or more multipath objects of interest; and
analyze the current localization map, the sensor data, and the one or more multipath objects of interest to operate the acceleration, braking, and steering systems of the AV along a current route within the given region.

2. The AV of claim 1, wherein the executed instruction set further causes the AV control system to:
process the radar data by removing at least one of the identified multipath objects from the radar data using the current localization map, wherein the analyzed sensor data for operating the acceleration, braking, and steering systems includes the processed radar data.

3. The AV of claim 1, wherein the executed instruction set causes the AV control system to identify the one or more multipath objects of interest based on a velocity variance between the one or more multipath objects of interest and a remainder of the identified multipath objects.

4. The AV of claim 1, wherein the sensor array further comprises at least one of a LIDAR system and a camera system.

5. The AV of claim 4, wherein the executed instruction set further causes the AV control system to identify the one or more multipath objects of interest by comparing identified multipath objects with at least one of LIDAR data from the LIDAR system or image data from the camera system.

6. The AV of claim 4, wherein the executed instruction set causes the AV control system to track the one or more multipath objects of interest to at least partially resolve an occlusion in at least one of LIDAR data from the LIDAR system or image data from the camera system.

7. The AV of claim 6, wherein the executed instruction set causes the AV control system to track the one or more multipath objects of interest to at least partially resolve the occlusion by performing a number of ray tracing operations on the sensor data to determine a trajectory of each of the one or more multipath objects of interest.

8. A radar multipath processing system comprising:
one or more processors; and
one or more memory resources storing instructions that, when executed by the one or more processors, cause the one or more processors to:
receive radar data from a radar system of an autonomous vehicle (AV);
access a current localization map from a set of localization maps stored on-board the AV, the current localization map indicating a current surrounding of the AV; and
compare the radar data with the current localization map to identify multipath objects in the radar data;
from the identified multipath objects, identify one or more multipath objects of interest; and
track the one or more multipath objects of interest for the AV.

9. The radar multipath processing system of claim 8, wherein the executed instructions further cause the one or more processors to:
process the radar data by removing at least one of the identified multipath objects from the radar data using the current localization map; and
provide the processed radar data to an AV control system that utilizes the processed radar data to operate acceleration, braking, and steering systems of the AV along a given route.

10. The radar multipath processing system of claim 8, wherein the executed instructions cause the one or more processors to identify the one or more multipath objects of interest based on a velocity variance between the one or more multipath objects of interest and a remainder of the identified multipath objects.

11. The radar multipath processing system of claim 8, wherein the executed instructions cause the one or more processors to identify the one or more multipath objects of interest by comparing the identified multipath objects with at least one of LIDAR data from a LIDAR system of the AV or image data from a camera system of the AV.

12. The radar multipath processing system of claim 8, wherein the executed instructions cause the one or more processors to track the one or more multipath objects of interest to at least partially resolve an occlusion in at least one of LIDAR data from a LIDAR system of the AV or image data from a camera system of the AV.

13. The radar multipath processing system of claim 12, wherein the executed instructions cause the one or more processors to track the one or more multipath objects of interest to at least partially resolve the occlusion by performing a number of ray tracing operations on the radar data to determine a trajectory of each of the one or more multipath objects of interest.

14. A computer-implemented method of autonomously operating a vehicle, the method being performed by one or more processors and comprising:
receiving sensor data from a sensor array of the vehicle, the sensor data including radar data from a radar system of the vehicle;
accessing a current localization map for a given region from a set of localization maps stored in memory on-board the vehicle, the current localization map indicating a current surrounding of the vehicle;
comparing the radar data with the current localization map to identify multipath objects in the radar data;
from the identified multipath objects, identify one or more multipath objects of interest; and
track the one or more multipath objects of interest for the vehicle,
analyzing the current localization map, the sensor data, and the one or more multipath objects of interest to operate acceleration, braking, and steering systems of the vehicle along a current route within the given region.

15. The method of claim 14, further comprising:
processing the radar data by removing at least one of the identified multipath objects from the radar data using the current localization map, wherein the analyzed sensor data for operating the acceleration, braking, and steering systems includes the processed radar data.

16. The method of claim 14, wherein the one or more processors identify the one or more multipath objects of interest based on a velocity variance between the one or more multipath objects of interest and a remainder of the identified multipath objects.

17. The method of claim 14, wherein the sensor array further comprises at least one of a LIDAR system and a camera system.

\* \* \* \* \*